United States Patent [19]

Barnes

[11] Patent Number: 4,843,504

[45] Date of Patent: Jun. 27, 1989

[54] SUPERCONDUCTOR DEVICES USEFUL FOR DISK DRIVES AND THE LIKE

[75] Inventor: Frank S. Barnes, Boulder, Colo.

[73] Assignee: University of Colorado Foundation, Inc., Boulder, Colo.

[21] Appl. No.: 155,192

[22] Filed: Feb. 12, 1988

[51] Int. Cl.$^4$ .................. G11B 5/55; H02K 41/00
[52] U.S. Cl. .................. 360/106; 310/10; 360/97.01; 360/99.08; 505/1
[58] Field of Search ............... 360/104–106, 360/97.02, 97.01; 505/1, 903–907; 310/10–12, 52

[56] References Cited

U.S. PATENT DOCUMENTS

| | | |
|---|---|---|
| 3,005,117 | 10/1961 | Buchhold . |
| 3,026,151 | 3/1962 | Buchhold . |
| 3,072,750 | 1/1963 | Barry . |
| 3,246,384 | 4/1966 | Vice . |
| 3,378,315 | 4/1968 | Webb . |
| 3,508,014 | 4/1970 | Mersing . |
| 3,810,683 | 5/1974 | Keever et al. . |
| 4,065,188 | 12/1977 | Ridler et al. . |
| 4,414,594 | 11/1983 | Farmer .................. 360/106 |
| 4,646,184 | 2/1987 | Goto et al. . |

FOREIGN PATENT DOCUMENTS 60-154315  8/1985  Japan .

OTHER PUBLICATIONS

Shimizu et al., "An Exploratory Study of a Magnetic Bearing Using Superconductive Magnets", *JSME*, Oct. 1972, pp. 1299–1305.
Gilmore, "The Cryo Gyro", *Machine Design/Engineering News*, Feb. 04, 1960, pp. 14–15.
Gilmore, "Cryogenics Electronics at Ultra-Low Temperatures", *Electronics World*, Jul. 1962, p. 23 et seq.

*Primary Examiner*—A. J. Heinz
*Attorney, Agent, or Firm*—Earl C. Hancock

[57] ABSTRACT

Superconducting material improves the operating efficiency and reduces the operating power demand for a disk drive suitable for interchanging data with a magnetic or optic media. The arm containing the head is moved along a path by a balanced superconductor to magnetic field interface such as for radial positioning relative to a circular media and is maintained in constant spatial relation with respect to the media by advantageous application of superconductive layers and magnetic field sources. The superconductor environment also permits efficient bearing support for the media as well as accommodating superconductor motors for driving the media and the use of various circuit elements associated with the drive electronics.

14 Claims, 2 Drawing Sheets

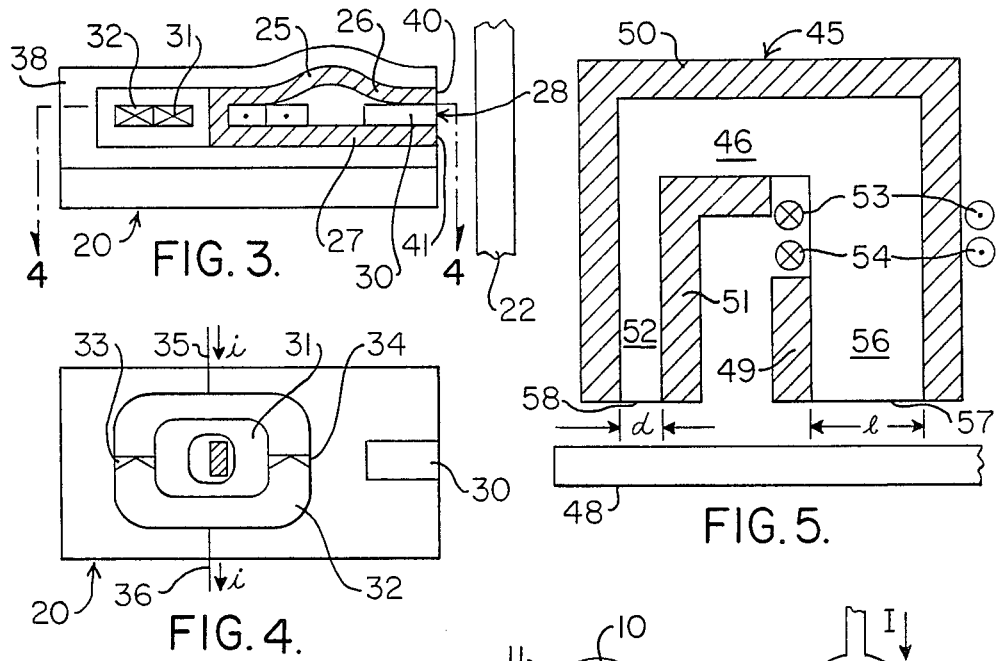
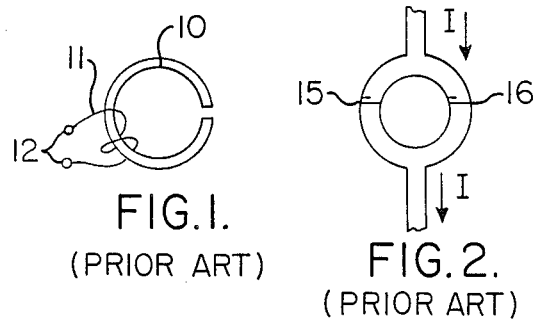
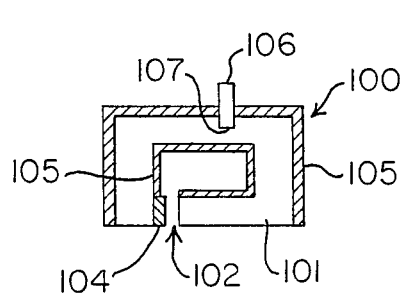
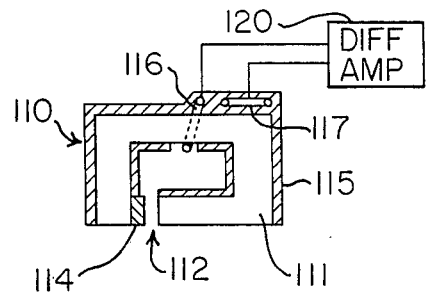

SUPERCONDUCTOR DEVICES USEFUL FOR DISK DRIVES AND THE LIKE

TECHNICAL FIELD

The present invention relates to methods and apparatus for handling information carrying disks such as magnetic disk drives and optical disk drives. More particularly, this invention relates to methods and apparatus utilizing superconductor elements to provide highly efficient and sensitive handling of various disk supporting functions as well as to implement superconductor elements in an efficient and accurate linear positioning mechanism for detector heads relative to a recording media. While the invention is especially useful for magnetic recording, it is also amenable to use for optical disks and other information storage systems. By incorporating several of the superconductor elements and features of this invention in a single device, it is possible to construct a magnetic disk drive with data densities comparable with optical disk systems while maintaining remarkably high levels of sensitivity and efficiency.

BACKGROUND

There are a variety of prior art approaches to concentrating and controlling the magnetic field in magnetic read/write heads for recording and reading with respect to magnetic media. Conventional such heads are configured in a horseshoe or U-shaped configuration for the magnetic flux circuit, typically with some enhancement at the gap at the end of the device's arms for the purpose of diverting the magnetic flux outwardly from the gap towards the magnetic media.

Sometimes the gap flux concentration enhancements take the form of sandwiches of conducting and insulating material to establish eddy currents at the gap to create magnetic forces diverting the flux from the head circuit. Examples of this are shown in U.S. Pat. No. 3,072,750, by Barry, U.S. Pat. No. 3,246,384 by Vice, 3,508,014 by Mersing and U.S. Pat. No. 4,646,184 by Goto et al. Japanese application No. 60-154315 by Ogawa which it is understood was published on Aug. 14, 1984 employs a recording head with the magnetic flux path interrupted at the gap by a superconductor material. It is known that a material in its superconductive state may block passage of magnetic flux therethrough with appropriate thickness, purity and B-field level (the Meissner effect). It may also guide magnetic flux through vortex regions and bend flux lines towards the material surface. Accordingly, the superconductive plug in the Ogawa head gap should cause maximum magnetic flux density outwardly from the gap and in the direction of the media.

Magnetic fields are, used as bearings as in U.S. Pat. No. 3,810,683 by Keever et al. Use of superconductors for supporting bearings is known as in U.S. Pat. No. 3,378,315 issued to NASA wherein a superconductor material is used for a spindle bearing with either permanent magnets or electromagnets providing the supporting magnetic field after the more conventional lubricant has outgassed in the atmospheric void of space. U.S. Pat. No. 3,026,151 by Buchhold also shows superconductor bearings but with the actuator coils likewise formed of superconductor material. Shimuzu et al in the October 1972 Bulletin of the JSME (Vol. 15, No. 88) at pages 1299-1305 shows superconductor wires in coils cooperating with magnetic plungers to support them by levitation.

Use of superconductor elements to form a motor is suggested in U.S. Pat. No. 3,005,117 by Buchhold as well as in the Feb. 4, 1960 issue of Machine Design/Engineering News at pages 14-15. It is also known to use magnetic fields for linear bearings as in U.S. Pat. No. 4,065,188 by Riddler et al which discusses a device using magnetic lubricant at the bearing faces but does not teach how to apply superconductors for such a purpose.

Gilmore in the July 1962 issue of Electronics World (pages 23 et seq) surveyed a variety of the then known cryogenic switches and superconductor devices including magnetic bearings using superconductors, superconductive memory circuits, superconductive power storage devices, friction-less motors, and zero-loss power transmissions. Perhaps Gilmore was somewhat overly optimistic in predicting the speed with which the various superconductor applications would develop. However, contemporary superconductor material discoveries have generated renewed interest in these devices.

Extremely sensitive magnetic field detecting structures are evolving. These devices are sometimes referred to as SQUIDs which is an acronym for Superconducting Quantum Interference Device. One configuration for a SQUID employs two Josephson Junction devices in parallel. Despite the more recent advances in superconductor material, none of the known prior art has effectively harnessed the phenomenon so as to realize the highly efficient and high density magnetic reading and writing as is obtained by the present invention. Further, the incorporation of various superconductor features in a magnetic drive system pursuant to this invention is not suggested in the art including the structure of a superconductor linear actuator useful for magnetic disk applications, optical disk applications, and other information storage systems.

DISCLOSURE OF THE INVENTION

The present invention advantageously utilizes superconductor material to produce several unique features. A primary feature resides in the arrangement for suspending a head carrying arm which is radially positionable relative to a media for interchanging information with that media. A bearing assembly for the arm includes a superconductor layer and a magnetic field source which are mounted in interfacing relation so as to support the arm throughout its radial travel.

Yet another feature of the invention is in positioning a carriage that is constrained to move along a predetermined path by use of a superconductor member and a variable magnetic field producing member, one of which is attached to the carriage. The other member is positioned to interact with the carriage attached member so as to establish a force on the carriage along the predetermined path. By applying a counter force to the carriage in the opposite direction, the carriage will move along the predetermined path until the two forces balance.

Still another feature of this invention relates to a magnetic recording and reading system including superconductive material for a magnetic disk suspension, superconductive material for an actuator coil cooperative with superconductive material for a rotary drive associated with the disk, and a superconductive linear positioning mechanism including a linear magnetic field source and a linear superconductor strip one of which overlies the other to establish positioning control for a magnetic read/write head relative to the disk which also has a magnetic media thereon. The powering circuits for the system may also employ superconductive material to advantageously utilize the superconductive environment. Also the a superconductive read/write head is useable relative to the linear positioning device.

Those having normal skill in the art will recognize the foregoing and other objects, features, advantages and applications of the present invention from the following more detailed descriptions of the preferred embodiments as illustrated in the accompanying drawings.

BRIEF DESCRIPTION OF THE DRAWINGS

FIGS. 1 and 2 are conventional Josephson Junction detectors or SQUIDs suitable for use as RF and DC current detectors, respectively.

FIG. 3 is a side, section view of a magnetic read/write head useful in conjunction with this invention.

FIG. 4 is a top, section view of the FIG. 3 read/write head showing the position of a Josephson Junction detector.

FIG. 5 is a section view of a magnetic read/write head also useful in conjunction with this invention and which is arranged for vertical magnetic recording on a media.

FIG. 6A is a section view of another magnetic read/write head embodiment.

FIG. 6B is an embodiment of a head similar to FIG. 6A but with a different SQUID coupling arrangement.

DETAILED DESCRIPTION OF THE PREFERRED EMBODIMENTS

Figure 8:
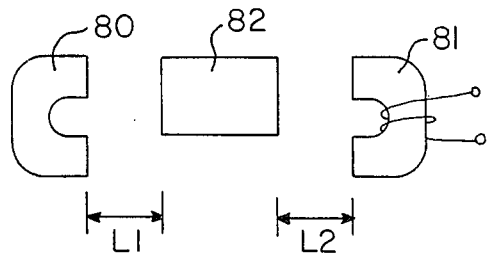
FIG. 8 is an arrangement for linearly positioning a superconductor element by balanced magnetic fields.

The present invention employs high-temperature (high-Tc) superconductors to improve performance of magnetic recording on a media including disks and tapes. The invention is particularly well suited for advantageously utilizing the magnetic field change detection capabilities of SQUIDs or superconducting Josephson junction devices such as those illustrated in FIGS. 1 and 2.

The FIG. 1 Josephson junction is formed of a gapped superconductor loop 10 and a coupled coil 11. The device is tuned and biased by RF current induced in coil 11. Detection at output terminal 12 is in response to presence of an upper harmonic of the RF bias frequency. That is, a change of the quasi-static applied flux produces a higher frequency component. Josephson junction devices work as magnetic flux to voltage converters with an optimum sensitivity of a few magnetic flux quantums and outputs in the microvolt range.

FIG. 2 illustrates a DC SQUID wherein two Josephson junctions 15 and 16 are positioned to detect the presence of current I flowing through conductive material in response to presence of a magnetic field. Josephson junction devices 15 and 16 provide an output voltage which varies with the magnetic flux in a quantified way that allows detection of changes of a few discrete flux quanta and possible encoding of $2^n$ bits per position.

The FIGS. 1 and 2 superconductor Josephson junction pairs or SQUIDs 10 and 16 detect changes in the magnetic flux as the head travels over the surface where bits are present on a magnetic disk or tape. SQUIDs are preferably coupled to superconducting loops which have inductance but no resistance. The SQUID has extremely low noise characteristics and will detect a single flux quantum under proper circumstances. The need for use of these devices in a liquid helium environment has discouraged more widespread use of the SQUIDs.

However, the development of materials that are superconductive at higher temperatures as high as 95° K. has renewed focus on such devices. For example, by using barium-yttrium-copper oxide material, it is feasible to operate the entire assembly at liquid nitrogen temperatures of 77° Kelvin or higher. As development of new materials continues, it is readily apparent that the cooling requirements will present even less restrictions. Even dry ice or room temperature environments are now foreseeable thereby rendering SQUIDs even more promising for reading magnetically stored information.

The SQUID is attractive since it is well suited to functioning in digital form and might allow storage of information at multiple levels of the field, allowing high bit densities per unit of space. However, with contemporary material, it is estimated that signal-to-noise ratios are possible at higher than 1000 to 1 for SQUID detectors reading magnetic bits as small as 2 by 1 microns. This represents an increase by approximately a factor of 20 in recording density over that currently available with the best high-density magnetic disk. Both RF and DC SQUIDs appear promising.

Another use of superconducting coils is as part of a write circuit. This reduces the RC time constant in the drive circuit as well as reducing the heat dissipated. Using the oriented thin film head with wires a few microns in diameter and on the order of a micron or so thick can generate the write fields. FIG. 3 is a section view of a magnetic head 20 using the Meissner Effect as an insulator to define the bit size for detection or storage relative to magnetic media 22. Head 20 is also shown in a top, section view in FIG. 4.

Head 20 is formed with a ferrite or high mu strip 25 which is formed in a generally U-shape so that upper arm 26 and lower arm 27 terminate with a gap 28 in proximity to media 22. Gap 28 is filled with a plug 30 of superconductive material. The interior bend of U-shaped member 25 is magnetically coupled with two coils or superconducting loops 31 and 32, the latter including two Josephson junction detectors 33 and 34 (FIG. 4) to sense the presence of magnetically induced currents "i" at output leads 35 and 36. Coil or loop 31 is connected to external leads (not shown) which are selectively energized to generate the magnetic flux for appropriate writing on media 22. Note that, since a superconducting environment is already available, further operating efficiency is realizable for heads in accordance with this invention by fabricating coil 31, coil 32, or both of them, as loops of superconductive material. As best seen in FIG. 3, head 20 is encased in superconductor layer 38 on inert substrate 39.

Note that the outer ends or faces 40 and 41 (FIG. 3) are not encased by superconductor layer 38. Thus, encasing layer 38 is deposited in a configuration that effectively intercepts magnetic flux fields and directs them into a well defined, concentrated area for sensitive recording and detecting in an extremely high density of data relative to a magnetic media 22. Media 22 typically is a magnetic recording disk although head 20 is suitable for use with other media such as magnetic tape.

The FIGS. 3 and 4 magnetic read/write head embodiment advantageously utilizes the Meissner Effect. By sheathing the horseshoe shaped high mu or ferrite magnetic path defining member 25 with superconductor material 38 as shown, the superconductor layers prevent the magnetic fields from escaping beyond the outer surfaces of head 20 except at faces 40 and 41 at gap 28 in proximity to recording media 22 as shown. Thus heads constructed like head 20 are extremely efficient with no interference between writing elements if more than one are arrayed on a single head. Furthermore, the geometry of the recording flux at the read/write gap 28 is sharply focused and extremely small. Heads pursuant to FIGS. 3 and 4 are particularly well suited for horizontal magnetic recording orientation. However, an improvement in operational performance for a vertical recording head is obtainable by a similar application of a superconductor to reduce leakage flux.

The Meissner effect not only provides focusing of the write field from the head 20, but it also reduces thermal noise during reading as caused by read/write pick-up coil resistance and provides adjacent track magnetic shielding. Thus a read/write head might typically include an array of read/write channels with heads such as 20 mounted in tandem on a single block.

When considering a typical thin film head structure, making the read/write coils 31/32 as loops of superconductive material will lower or eliminate both heating effects during write operation and thermal Johnson noise during read operation. Current density limitations may dictate fabricating the read/write coil from a high-temperature superconductor/room temperature conductor sandwich. The sandwich configuration could prove effective to overcome any tendency of the write current density to switch the superconductor to the "normal" state. Then the normal conductor would carry the current.

In a typical thin-film head 20, the throat which is comprised of the magnetic pole pieces 26 and 27 and non-magnetic gap material 30, represents a shunt path for the magnetic flux for both read and write. The desire is to minimize this throat length in order to increase the head efficiency for both the read and write functions. If the "gap" material 30 is made of a superconductor and also the material surrounding the pole pieces in the throat area, no flux is lost across gap 28 as the Meissner effect precludes this from occurring. In effect the throat length (or height) is virtually zero in length. This means the head efficiency is maximized. Furthermore, it is possible that the need for lapping the throat height to a precise length is avoidable.

Many benefits stem from this configuration. Write efficiency is enhanced which results in much lower current demand; pole piece saturation is less of a problem. Pole piece throat lengths are long enough to assure minimum non-linearity, which may be a problem when pole pieces have a short throat. There is no fringe flux writing. This will make for a much sharper magnetic transition in the media due to a much better defined magnetic field in the gap region. This in turn allows for increasing the recording density.

By surrounding the pole pieces with superconductive material as shown, the Meissner effect perfectly shields the sides of the pole pieces from picking up magnetic patterns from adjacent tracks. That is, the wide part of the pole piece tends to pick up signals from adjacent tracks, albeit with a substantial separation loss. The shorter the throat, the greater the problem. A much longer throat is possible if it is shielded by a superconductor and therefore the separation loss for adjacent tracks becomes significantly larger. Adjacent cross-talk is only that picked up by the pole face. Further reduction of the effects of cross-talk in reading by introducing a second SQUID which is not coupled to the read gap and operating the two SQUIDS in a differential mode. This could prove useful in balancing out magnetic fields from superconductor/magnet bearing assemblies and superconductor motors.

Manufacturing cost of the heads configured in accordance with this invention are significantly reduced because one of the more difficult lapping processes is substantially eliminated, and the precise throat height is not an issue. Read pick-up flux is no longer lost across the gap but will link the coils and therefore the detectors.

Making the coils as loops of superconductive material eliminates that source of resistive noise. If the system including the preamplifier is immersed in liquid nitrogen fumes, both the magnetic and amplifier noise is reduced to about ½ that at room temperature.

Utilization of read/write heads pursuant to this invention permits a significant increase in practical track density. Site field fringing is minimized while read/write efficiency is maximized with amplifier and magnetic noise reduced by at least a factor of 2. A 2 $\mu M$ pitch with a 1 $\mu M$ track width is believed entirely feasible where $\mu M$ is a micron. This allows a density of 12,500 tracks per inch which is quite competitive with optical track densities.

The present invention is well suited for markedly improving performance of a magnetic recording system that centers about the present approach to magnetic mechanisms—e.g. conventional disc and tape drives generally using contemporary geometry for vertical and horizontal recording. The main departure is in utilizing the Meissner Effect to focus on reducing both the mechanisms associated with head signal loss and cross-talk from adjacent tracks and the use of a SQUID to detect the recorded magnetic fields. The other considerations associated with lower noise due to a lower ambient temperature do appear useful, however. Contemporary thin film head fabrication techniques are available for constructing heads and various other drive elements in accordance with this invention.

Preferably a stable environment at liquid nitrogen temperature is established for the head and the other superconductor elements of the drive with that environment maintained despite the presence of significant heat sources. For example, heat may well result from gas friction due to rotating platters, from operation of the drivers, and from current heating. Even with conventional windings, heat from these sources is reducible to about 1/50th that of present heads and by virtue of head efficiency.

The FIG. 5 embodiment is especially useful when vertical magnetic orientation of recording and reading is desired. Read/write head 45 has a core member 46 in a generally U-shaped configuration and made of ferrite or high mu material. Member 46 is positioned in proximity to magnetic media 48. A superconductive material forms an external case 50 for member 46 and includes internal coating 51 for arm 52. Coils or superconductor loops 53 and 54 encircle arm 56 which does not have an interior superconductor coating thereby permitting direct magnetic coupling to member 46 via arm 56. One of coils 53 and 54 contain a Josephson junction detector (not shown) and the other coil is used for selective energizing during magnetic writing. Note that the vertical magnetic recording orientation is created by maintaining the dimension of "L" at gap face 57 for arm 56 much greater than the dimension "D" of gap face 58 for arm 52.

FIG. 6A illustrates yet another embodiment of a magnetic read/write head 100 in accordance with this invention. Here the magnetic circuit is formed by high mu member 101 which has a gap 102 partly filled by superconductor plug 104. The exterior surface of head 100 is encased with a superconductor film 105 except along the surface including the gap 102 and at a slot which is filled with SQUID detector 106. While it is possible to encircle core 101 with SQUID 106, it is also acceptable to incorporate a shallow notch 107 in magnetic flux path 101 and fill notch 107 with the SQUID 106 as shown. Thus SQUID 106 will detect even small changes in the magnetic flux contained within the magnetic circuit defined by member 101. Other schemes for varying the coupling of the SQUID to the magnetic circuit may prove useful in optimizing the SQUID circuit inductance and sensitivity.

Head 110 of FIG. 6B is similar in configuration to FIG. 6A in the use of a magnetic circuit 111 with a gap 112. The detection is obtained by a somewhat different arrangement in that two DC SQUIDs 116 and 117 along the lines of FIG. 2 are included as shown. They are both within the encasing superconductor coating 115 but only SQUID 116 is magnetically coupled to magnetic circuit 111. The outputs of both SQUIDs are coupled to a differential amplifier 120. As a result, the effects of stray fields are eliminated while sensitivity to the fields within magnetic circuit 111 is maintained at an optimum.

Figure 7:
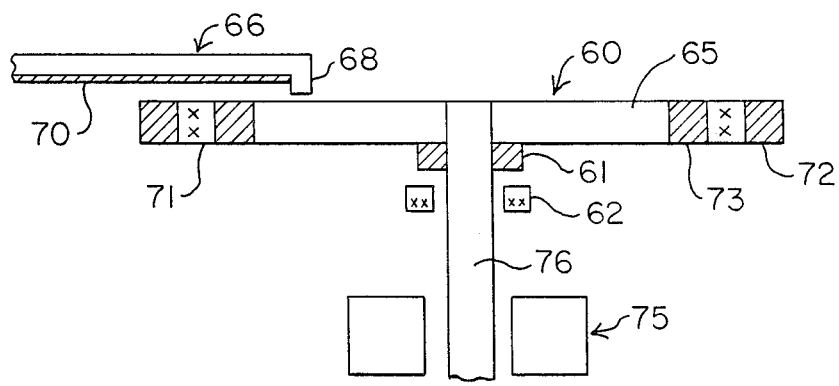
FIG. 7 is a partially sectioned view of a magnetic disk drive and read/write head positioning mechanism in accordance with this invention.

FIG. 7 illustrates a data recording apparatus 60 wherein superconductor layer 61 and magnet 62 cooperate to establish a magnetic bearing supporting disk 65. While read/write heads along the lines of the embodiments of FIGS. 3, 5 and 6 are suitable for use in drive 60, the device can function with any type of head including existing conventional heads. The radially moveable arm assembly 66 has the head attached typically at 68 and a superconductor undercoat 70 to cooperate with annular ring magnet 71 affixed to the outer perimeter of disk 65. Ring magnet 71 is further sandwiched between superconductor layers 72 and 73 to concentrate the magnetic field in the direction of radial arm 66 layer 70 and thus suspend it at a fixed distance above the upper surface of disk 65. Note that the magnet and superconductor layers are interchangeable for the bearing formed by 61 and 62 as well as for 70 and 71.

Since a superconductor environment is already available, it is possible to advantageously utilize a superconductor motor 75 to impart rotary motion to support spindle 76 for disk 65. By using superconductors as described, operation in a vacuum can further reduce friction losses and allow operation in a nearly frictionless environment. Thus it would respond to a very low power level and rotate disk 65 at an extremely stable velocity. Note that type-two superconductors (which include BaYCuO) are stabilized by vortices in a nonuniform magnetic field. The use of superconductor coils in motor 75 should allow construction in a small, light configuration for motor 75 while producing high magnetic field levels. The high field fluxes in motor 75 and the drive system are shielded from the recording media on disk 65 by means of the Meissner Effect. Other advantages of working in a vacuum include removal of dust and water vapor. This reduces head crashes and problems of surface aging of the recording material.

Since the superconductor temperature (e.g.: liquid nitrogen, etc.) is present, it is advantageous to use superconductor film for interconnections of the electronic circuitry associated with the drive 60 and head 68. Thus the output stage of a pre-amplifier operating in the superconductively cooled environment makes it possible to realize not only increased efficiency but also improved noise properties of amplifier electronics and an increase in the speed of response if the front end or pre-amplifier stage is made with HMFET's, for instance. HMFET's exhibit extremely high mobility at liquid nitrogen temperatures.

Preferably the drive of FIG. 7 including electronics and the drive motor is packaged in an atmosphere suitable for the superconductors such as by cooling to about 77° Kelvin through liquid nitrogen vapor. Liquid nitrogen is relatively inexpensive and storable in insulators as ordinary as a conventional thermos bottle with only moderate evaporation rates. The FIG. 7 type disk drive should demand modest system support costs. As further enhancements to superconductor materials at higher temperatures are developed, the system cost will improve even further. For large systems with large amounts of data with medium access times for the magnetic disk are involved, closed cycle refrigeration systems are also practical.

With regard to FIG. 7, note that support for disk 5 is obtainable by configuring either superconductor ring 61 or annular magnet 62 so as to cooperate with magnet 71 or superconductor rings 72 and 73, respectively. That is, when configured with an appropriate diameter, superconductor ring 61 can cooperate with annular magnet 71 to support disk 65 without magnet 62. Alternatively, magnet (or electromagnet) 62 with an appropriate diameter can interface with either or both of superconductor rings 72 and 73 to provide support for disk 65 without superconductor ring 61.

FIG. 8 shows a linear actuator system potentially useful for control of the position of a head and arm assembly such as arm 66 in FIG. 7. This is accomplished by a balancing system driving a superconductor with magnetic fields using the Meissner Effect. Magnet 80 (shown as a permanent magnet but which can be an electromagnet) and electromagnet 81 are oriented in the direction of the intended path of movement of superconductor box 82. Box 82 is attached to, or otherwise a part of, the read/write head positioning arm. By changing the current in electromagnet 81, its field is effectively pitted against the field from magnet 80. Thus the head is positioned by a push-pull drive between magnets 80 and 81 through the action of the variable magnetic field and the magnetic field gradient. Box 82 is mounted so that it is physically constrained from vertical movement but is free to move horizontally. Note that various configurations of the magnets and superconductor are acceptable to produce substantially the same result. For instance, the head mount could include one of the magnets in an appropriate orientation relative to the superconductor.

Position control is obtained by means of the inductance or the magnetic susceptibility X with a small high frequency field. The spacing of the magnets and superconductor changes the inductance L in that L is a function of the distance L2 in FIG. 8. Superconductor 82 acts as a magnetic mirror. It is also possible to employ positioning coils on all three axis if desired. Vertical head positioning is effected by a superconductor layer under the magnetic recording material and a vertical ring to generate a uniform magnetic field perpendicular to the disc which could thus float the shield of superconductor around the read/write head. Alternatively, a coil or superconductor ring could float the shield around the head and could include a trimming field for the head.

Figure 9:
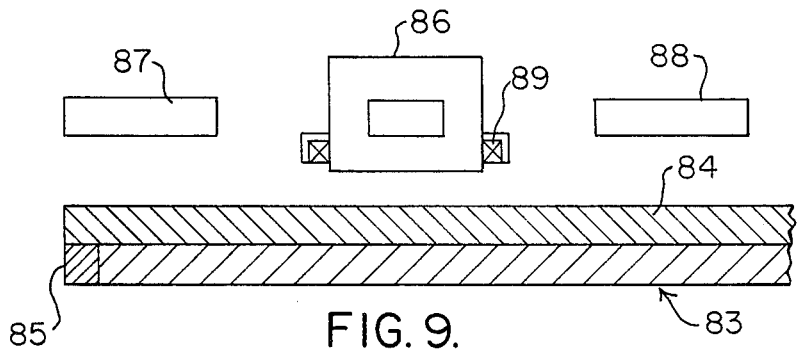
FIG. 9 is a configuration for applying the FIG. 8 concept to a read/write head linear actuator.

A head positioning system along the lines of FIG. 8 is shown with some refinements in FIG. 9. A section view of a radial portion of a magnetic recording disc 83 is shown with a layer 84 of magnetic recording material and a superconducting ring 85 with current for generating a uniform magnetic field inside the loop. The head 86 is encased in a superconductor shield and oriented between positioning magnets 87 and 88 which function to radially position head 86 over the recording layer 84 as described for FIG. 8. Trim coil 89 allows for vertical height adjustment.

A two stage head positioner with a linear motor using superconductor windings for positioning control allows light weight construction and a few micron movement accuracy. Position measurement is possible by determining the frequency of resonant current. A very small inductance is involved for superconductor coils or windings so that losses are low and the Q is high. The circuit could form part of a feedback loop of an oscillator and the output frequency will correspond to the head position as a function of frequency. Two SQUIDS in a magnetic gradient measuring configuration are also potentially useful as an extremely sensitive measure of the head position as changes in inductance are equivalent to changes in magnetic flux. Optical measurement of the head position is also feasible by making one wall of head 86 a mirror in a Michlson interferometer.

Fine wires or contact rails can carry the signals into and out of the head although other signal interfacing arrangements are possible such as micro-coaxial coupling, transmitter/receiver assemblies, and/or an optical system (e.g.: optical fibers, LED or laser units with self contained control circuitry in the head assembly, etc.). Yet another signal coupling alternative to avoid friction relative to the head and its positioning assembly is to employ inductive coupling of high frequency data signals thereby allowing complete suspension of head 86. Several arrangements are available for optical coupling into the head such as by a flexible fiber or by transmitting through the vacuum from an LED or laser.

Figure 10:
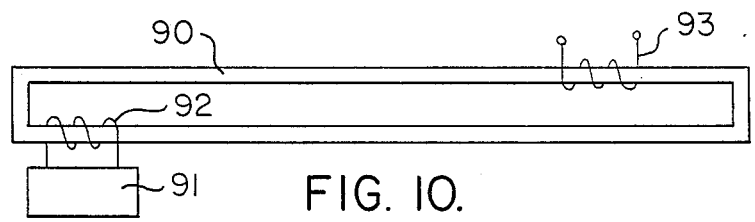
FIG. 10 is a magnetic coupler for a linear actuator.

FIG. 10 is an example where the read/write head is associated with an elongated magnetic core 90 that is positioned horizontally by the balanced push/pull magnet drive and which has a transformer magnetic material rail as shown. Signal source 91 is coupled to coil 92 in magnetic communication with core 90. This permits reading of detected information as well as writing signal introduction to the system. An example is coil 93 which is attached to the head carriage and, while not in physical contact with core 90, is magnetically coupled to core 90.

Note it is possible to separate positioning coils in space so they are independent. The loops must have inductances balanced for best SQUID sensitivity without disturbing magnetic recording. Extra circuits should receive coaxial or superconductor shielding.

Carriage 82 of FIG. 8 is constrained to move along a predetermined path in a line between magnetic field emanating sources 80 and 81 which are typically in fixed positions. The same is true of carriage 86 between magnetic sources 87 and 88 in FIG. 9. However, it is possible to reverse the roles of these members such as by using superconductor shields in place of magnets 87 and 88 while mounting variable strength magnets on carriage 86. Also it is possible to attach one of the magnets 87 or 88 to the same carriage 86 with the superconductor but on the side opposite to the other of those two magnets. Still another alternative is to place either or both of magnets 87 and 88 on their own selectively positionable carriage or other physically moveable structure.

Selection between the various type one and type two superconductor materials in designing systems in accordance with this invention is a function of the anticipated current and magnetic flux levels. Type one superconductors exhibit more complete ability to divert or direct magnetic flux but may change state at lower current carrying levels as compared to type two. Type two superconductors are less susceptible to abrupt state transitions and can handle the higher current and magnetic field levels. With respect to a given superconductor material, the critical field Hc1 is at the temperature above which magnetic fields are no longer completely excluded, whereas Hc2 is at the temperature where the material exhibits its transition between superconducting and normal states. For complete magnetic shielding, it is generally preferable to operate type two material below Hc1 although drive coils may operate at high current density or fields up to Hc2.

Although the present invention is described herein with particularity relative to the foregoing detailed description of the exemplary embodiments, those having normal skill in the art will recognize various modifications, changes, additions and applications of the present invention in addition to those mentioned herein without departing from the spirit of this invention.

What is claimed is:

1. Apparatus for exchanging information with a circular media and which includes a drive mechanism for radially positioning a head relative to the media with the head including structure for imparting information to the media, for detecting information on the media, or both, comprising:
   an arm having at least one head attached thereto wherein said head is capable of interchanging information with the media, and
   bearing means for suspending said arm, said bearing means including a superconductor layer element, a magnetic field source element and means mounting one of said elements on said arm and the other said element in interfacing relationship to said one of said elements so that said interfacing relationship is maintained throughout the radial travel of said arm.

2. Apparatus in accordance with claim 1 wherein said superconductor element forms the lower surface of said arm.

3. Apparatus in accordance with claim 2 wherein said magnetic field source element is an annular magnet peripherally positioned with respect to the circular media.

4. Apparatus in accordance with claim 3 which includes superconductor layers in sandwich relation to said annular magnet for concentrating the magnetic filed thereof in the direction of said superconductor layer element.

5. Apparatus in accordance with claim 4 which includes a second annular magnet in interfacing relation to said superconductor layers which are in sandwich relation to said annular magnet for supporting the circular media.

6. Apparatus in accordance with claim 3 which includes superconductor means cooperating with said annular magnet for supporting the circular media.

7. Apparatus in accordance with claim 1 wherein said superconductor layer element forms an outer peripheral surface of the circular media and said magnet source is a magnet along the surface of said arm facing said media peripheral surface.

8. Apparatus in accordance with claim 1 which includes means cooperating with one of said bearing assembly elements for suspending the circular media.

9. Apparatus in accordance with claim 1 which includes a second bearing assembly including an annular superconductor layer, an annular magnetic source means, and means positioning said layer and said source means in interfacing relation for supporting the circular media.

10. Apparatus in accordance with claim 9 which includes a superconductor motor for imparting rotary motion to the circular media.

11. A drive for exchanging information between a circular media mounted on a spindle and a head comprising an elongated arm having the head attached thereto and a layer of superconductor material on one side thereof, said arm being radially positionable over the surface of the circular media, an annular magnet means in peripheral relation to the circular media and oriented to direct a magnetic field towards said arm superconductor layer for maintaining a relatively constant spacing between said arm and the media throughout the radial travel of said arm relative to the circular media, a bearing assembly including a second annular magnet means and an annular ring of superconductor material in interfacing relation and attached for supporting said circular media in concentric relation to the media spindle, a motor constructed at least in part of superconductor material and coupled for imparting rotary motion to the media spindle, and means controlling the environment of said drive for maintaining all said superconductor materials in their superconducting state.

12. A drive in accordance with claim 11 which further includes a pair of circular shaped elements of superconductor material in sandwich relation around said first mentioned annular magnet for concentrating the magnetic field thereof in the direction of said arm superconductor layer.

13. A drive in accordance with claim 11 wherein the circular media is capable of handling magnetically encoded data and the head is of magnetic material having two arms formed in a U-shape with the arms terminating in a gap in proximity to the surface of said media, a plug of superconducting material at least partially filling the space between said arms at said gap, a coating of superconductive material encasing the external surfaces of said magnetic material except at said gap, and coil means magnetically coupled to said U-shaped magnetic material.

14. A drive in accordance with claim 13 wherein said coil means includes a SQUID detector.

* * * * *

UNITED STATES PATENT AND TRADEMARK OFFICE
CERTIFICATE OF CORRECTION

PATENT NO.  : 4,843,504
DATED       : June 27, 1989
INVENTOR(S) : Frank Stephenson Barnes It is certified that error appears in the above-identified patent and that said Letters Patent is hereby corrected as shown below:

Claim 14, line 37, "SOUID" should read --SQUID--.

Signed and Sealed this

Fifteenth Day of May, 1990

Attest:

HARRY F. MANBECK, JR.

*Attesting Officer*   *Commissioner of Patents and Trademarks*